US012567916B2

(12) United States Patent
Polgar et al.

(10) Patent No.: US 12,567,916 B2
(45) Date of Patent: Mar. 3, 2026

(54) SHOE WITH KNIT UPPER HAVING THERMOPLASTIC YARN REGIONS

(71) Applicant: Cole Haan LLC, Greenland, NH (US)

(72) Inventors: Ryan Polgar, Greenland, NH (US);
Mattias Verfl, Greenland, NH (US);
Laura Greelish, Greenland, NH (US);
Wai Ming Leung, Greenland, NH (US)

(73) Assignee: COLE HAAN LLC, Greenland, NH (US)

( * ) Notice: Subject to any disclaimer, the term of this patent is extended or adjusted under 35 U.S.C. 154(b) by 370 days.

(21) Appl. No.: 18/113,716

(22) Filed: Feb. 24, 2023

(65) Prior Publication Data

US 2023/0198646 A1     Jun. 22, 2023

Related U.S. Application Data

(62) Division of application No. 16/698,565, filed on Nov. 27, 2019, now Pat. No. 11,589,651.

(51) Int. Cl.

| | |
|---|---|
| *H04H 60/73* | (2008.01) |
| *A43B 23/02* | (2006.01) |
| *H04H 20/28* | (2008.01) |
| *H04H 20/91* | (2008.01) |
| *H04N 21/433* | (2011.01) |
| *H04N 21/434* | (2011.01) |
| *H04N 21/435* | (2011.01) |
| *H04N 21/438* | (2011.01) |
| *H04N 21/443* | (2011.01) |
| *H04N 21/462* | (2011.01) |
| *H04N 21/643* | (2011.01) |

(52) U.S. Cl.
CPC ......... *H04H 60/73* (2013.01); *A43B 23/0215* (2013.01); *A43B 23/025* (2013.01); *A43B 23/0255* (2013.01); *H04N 21/433* (2013.01); *H04N 21/4348* (2013.01); *H04N 21/435* (2013.01); *H04N 21/4383* (2013.01); *H04N 21/4431* (2013.01); *H04N 21/4622* (2013.01); *H04N 21/64322* (2013.01); *H04H 20/28* (2013.01); *H04H 20/91* (2013.01)

(58) Field of Classification Search
CPC .............. A43B 23/0255; A43B 23/025; A43B 23/0215
USPC .......................................................... 66/177
See application file for complete search history.

(56) References Cited

U.S. PATENT DOCUMENTS

| | | |
|---|---|---|
| 2004/0118018 A1 | 6/2004 | Dua |
| 2017/0245581 A1 | 8/2017 | McFarland, II et al. |
| 2018/0008006 A1* | 1/2018 | Boys .................. A43B 23/0245 |

(Continued)

*Primary Examiner* — Alissa J Tompkins
*Assistant Examiner* — Catherine M Ferreira
(74) *Attorney, Agent, or Firm* — Thompson Coburn LLP

(57) ABSTRACT

A shoe includes a knit upper and a sole secured to the knit upper. The knit upper is formed with a first type of knit structure knitted with a thermoplastic yarn in a first area. The first area is in at least the toe region of the knit upper. In a second area including at least the medial and lateral metatarsal regions of the knit upper, the knit upper is formed with a second type of knit structure knitted with a second yarn having a higher melting temperature than the thermoplastic yarn. A rear boundary line of the first area and a forward boundary line of the second area define a boundary line between the first and second areas.

16 Claims, 8 Drawing Sheets

(56) References Cited

U.S. PATENT DOCUMENTS

2019/0014854 A1 *  1/2019  Santos  ................. A43B 23/026
2019/0261741 A1 *  8/2019  Boys  .................. A43B 23/0205

* cited by examiner

SHOE WITH KNIT UPPER HAVING THERMOPLASTIC YARN REGIONS

CROSS-REFERENCE TO RELATED APPLICATIONS

This application is a division of U.S. patent application Ser. No. 16/698,565, now U.S. Pat. No. 11,589,651, filed Nov. 27, 2019, the disclosure of which is incorporated by reference herein.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to shoes having knit uppers.

SUMMARY

One aspect of the disclosure is a shoe comprising a knit upper and a sole secured to the upper. The knit upper has a knitted element formed of a unitary one-piece construction during a knitting process on a knitting machine. The knitted element comprises a knitted upper heel region, a knitted upper lateral midfoot region, a knitted upper medial midfoot region, a knitted upper metatarsal region, a knitted upper lateral ball region, a knitted upper medial ball region, and a knitted upper toe region. The knitted upper metatarsal region includes a knitted upper lateral metatarsal region and a knitted upper medial metatarsal region. The upper has a knitted upper lateral side region and a knitted upper medial side region, the upper lateral side region including the upper lateral midfoot region, the upper lateral metatarsal region and the upper lateral ball region, the upper medial side region including the upper medial midfoot region, the upper medial metatarsal region and the upper medial ball region. The upper toe region is seamlessly knitted with the upper medial and lateral ball regions during the knitting process, the upper medial and lateral ball regions are seamlessly knitted with the knitted upper metatarsal region during the knitting process, and the knitted upper metatarsal region is seamlessly knitted with the upper lateral and medial midfoot regions during the knitting process. The knitted element includes a wingtip pattern, the wingtip pattern being portions of at least the upper toe region, the upper lateral and medial ball regions, and the upper lateral and medial metatarsal regions. The knitted element comprises a first type of knit structure knitted in a first area during the knitting process and a second type of knit structure knitted in a second area during the knitting process. The first area has a rear boundary, and the second area has a forward boundary. The rear boundary of the first area and the forward boundary of the second area define a boundary line between the first and second areas. The wingtip pattern comprises the boundary line, the boundary line having a medial boundary line and a lateral boundary line. The medial boundary line comprises a wing-shaped curved line having a medial side portion extending forward from at least the upper medial metatarsal region to the upper toe region and a central portion extending rearward from the upper toe region, the lateral boundary line comprising a wing-shaped curved line having a lateral side portion extending forward from at least the upper lateral metatarsal region to the upper toe region and a central portion extending rearward from the upper toe region, the rearwardly extending central portion of the medial boundary line converging toward the rearwardly extending central portion of the lateral boundary line. The first type of knit structure comprises a first yarn having a first yarn melting temperature, and the second type of knit structure comprises a second yarn having a second yarn melting temperature higher than the first yarn melting temperature. The knitted element is heated after the knitting process at a temperature no lower than the first yarn melting temperature and lower than the second yarn melting temperature, to melt the first yarn without melting the second yarn.

Another aspect of the disclosure is a method of manufacturing an article of footwear having a knit upper and a sole. The method comprises knitting with a knitting machine to form a knitted element of the knit upper such that the knitted element is of a unitary one-piece construction comprising a knitted upper heel region, a knitted upper lateral midfoot region, a knitted upper medial midfoot region, a knitted upper metatarsal region including an upper lateral metatarsal region and an upper medial metatarsal region, a knitted upper lateral ball region, a knitted upper medial ball region, a knitted upper toe region, a knitted upper lateral side region including the knitted upper lateral midfoot region, the knitted upper lateral metatarsal region, and the knitted upper lateral ball region, and a knitted upper medial side region including the knitted upper medial midfoot region, the knitted upper medial metatarsal region, and the knitted upper medial ball region. During the knitting step, the knitted element is formed with a wingtip pattern, the wingtip pattern being portions of at least the upper toe region, the upper lateral and medial ball regions, and the upper lateral and medial metatarsal regions. Also during the knitting step, the knitted element is formed with a first type of knit structure knitted with a first yarn in a first area, the first area being at least in the knitted upper toe region, and formed with a second type of knit structure knitted with a second yarn in a second area, the second area being at least in the knitted upper lateral and medial metatarsal regions. The first yarn has a first yarn melting temperature, and the second yarn has a second yarn melting temperature higher than the first yarn melting temperature. The first area has a rear boundary, and the second area has a forward boundary, the rear boundary of the first area and the forward boundary of the second area defining a boundary line between the first and second areas. The wingtip pattern comprises the boundary line, the boundary line having a medial boundary line and a lateral boundary line. The medial boundary line comprises a wing-shaped curved line having a medial side portion extending forward from at least the upper medial metatarsal region to the upper toe region and a central portion extending rearward from the upper toe region. The lateral boundary line comprises a wing-shaped curved line having a lateral side portion extending forward from at least the upper lateral metatarsal region to the upper toe region and a central portion extending rearward from the upper toe region, the rearwardly extending central portion of the medial boundary line converging toward the rearwardly extending central portion of the lateral boundary line. The method includes heating the knitted element at a temperature lower than the melting temperature of the second type of knit structure and no lower than the melting temperature of the first type of knit structure, to melt the first type of knit structure in the first area without melting the second type of knit structure in the second area, and attaching the sole to the knit upper. During the knitting step, the knitted upper toe region is seamlessly knitted with the knitted upper medial and lateral ball regions, the knitted upper medial and lateral ball regions are seamlessly knitted with the knitted upper metatarsal region, the knitted upper metatarsal region is seamlessly knitted with the knitted upper lateral and medial midfoot regions, and the first and second areas are knitted.

Another aspect of the disclosure is a shoe comprising a knit upper and a sole secured to the upper. The knit upper has a knitted element formed of a unitary one-piece construction during a knitting process on a knitting machine. The knitted element comprises a knitted upper heel region, a knitted upper lateral midfoot region, a knitted upper medial midfoot region, a knitted upper metatarsal region, a knitted upper lateral ball region, a knitted upper medial ball region, and a knitted upper toe region. The knitted upper metatarsal region includes a knitted upper lateral metatarsal region and a knitted upper medial metatarsal region. The upper has a knitted upper lateral side region and a knitted upper medial side region, the upper lateral side region including the upper lateral midfoot region, the upper lateral metatarsal region and the upper lateral ball region, the upper medial side region including the upper medial midfoot region, the upper medial metatarsal region and the upper medial ball region. The upper toe region is seamlessly knitted with the upper medial and lateral ball regions during the knitting process, the upper medial and lateral ball regions are seamlessly knitted with the knitted upper metatarsal region during the knitting process, and the knitted upper metatarsal region is seamlessly knitted with the upper lateral and medial midfoot regions during the knitting process. The knitted element comprises a first type of knit structure knitted in a first area during the knitting process and a second type of knit structure knitted in a second area during the knitting process. The first area has a rear boundary, and the second area has a forward boundary. The rear boundary of the first area and the forward boundary of the second area define a boundary line between the first and second areas. The first type of knit structure comprises a first yarn having a first yarn melting temperature, and the second type of knit structure comprises a second yarn having a second yarn melting temperature higher than the first yarn melting temperature. The knitted element is heated after the knitting process at a temperature no lower than the first yarn melting temperature and lower than the second yarn melting temperature, to melt the first yarn without melting the second yarn.

Another aspect of the disclosure is a method of manufacturing an article of footwear having a knit upper and a sole. The method comprises knitting with a knitting machine to form a knitted element of the knit upper such that the knitted element is of a unitary one-piece construction comprising a knitted upper heel region, a knitted upper lateral midfoot region, a knitted upper medial midfoot region, a knitted upper metatarsal region including an upper lateral metatarsal region and an upper medial metatarsal region, a knitted upper lateral ball region, a knitted upper medial ball region, a knitted upper toe region, a knitted upper lateral side region including the knitted upper lateral midfoot region, the knitted upper lateral metatarsal region, and the knitted upper lateral ball region, and a knitted upper medial side region including the knitted upper medial midfoot region, the knitted upper medial metatarsal region, and the knitted upper medial ball region. During the knitting step, the knitted element is formed with a first type of knit structure knitted with a first yarn in a first area, the first area being at least in the knitted upper toe region, and formed with a second type of knit structure knitted with a second yarn in a second area, the second area being at least in the knitted upper lateral and medial metatarsal regions. The first yarn has a first yarn melting temperature, and the second yarn has a second yarn melting temperature higher than the first yarn melting temperature. The first area has a rear boundary, and the second area has a forward boundary, the rear boundary of the first area and the forward boundary of the second area defining a boundary line between the first and second areas. The method includes heating the knitted element at a temperature lower than the melting temperature of the second type of knit structure and no lower than the melting temperature of the first type of knit structure, to melt the first type of knit structure in the first area without melting the second type of knit structure in the second area, and attaching the sole to the knit upper. During the knitting step, the knitted upper toe region is seamlessly knitted with the knitted upper medial and lateral ball regions, the knitted upper medial and lateral ball regions are seamlessly knitted with the knitted upper metatarsal region, the knitted upper metatarsal region is seamlessly knitted with the knitted upper lateral and medial midfoot regions, and the first and second areas are knitted.

Further features and advantages, as well as the operation, are described in detail below with reference to the accompanying drawings.

Figure 1:
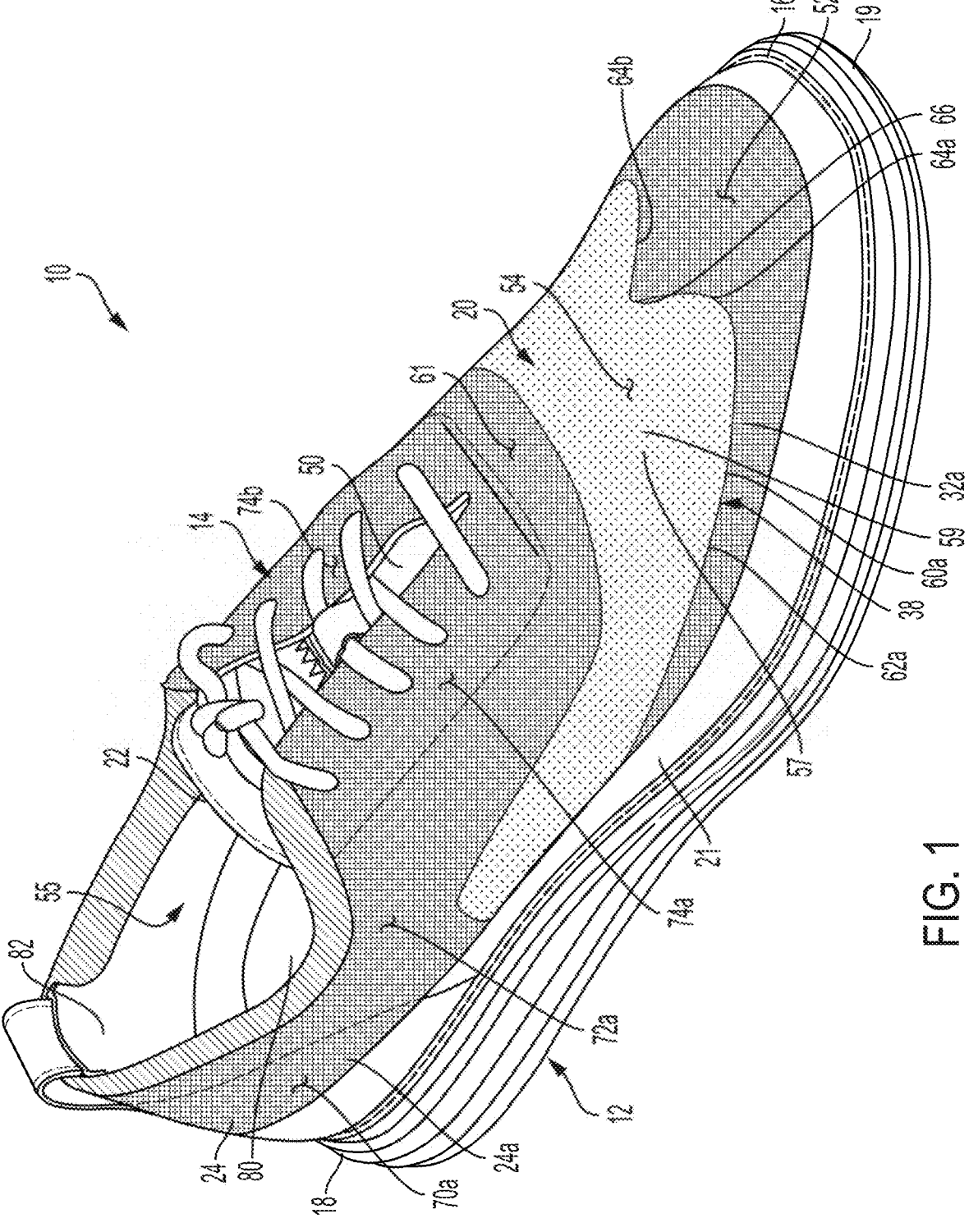
FIG. 1 is a front lateral perspective view of an exemplary embodiment of a shoe of the present disclosure.
Figure 2:
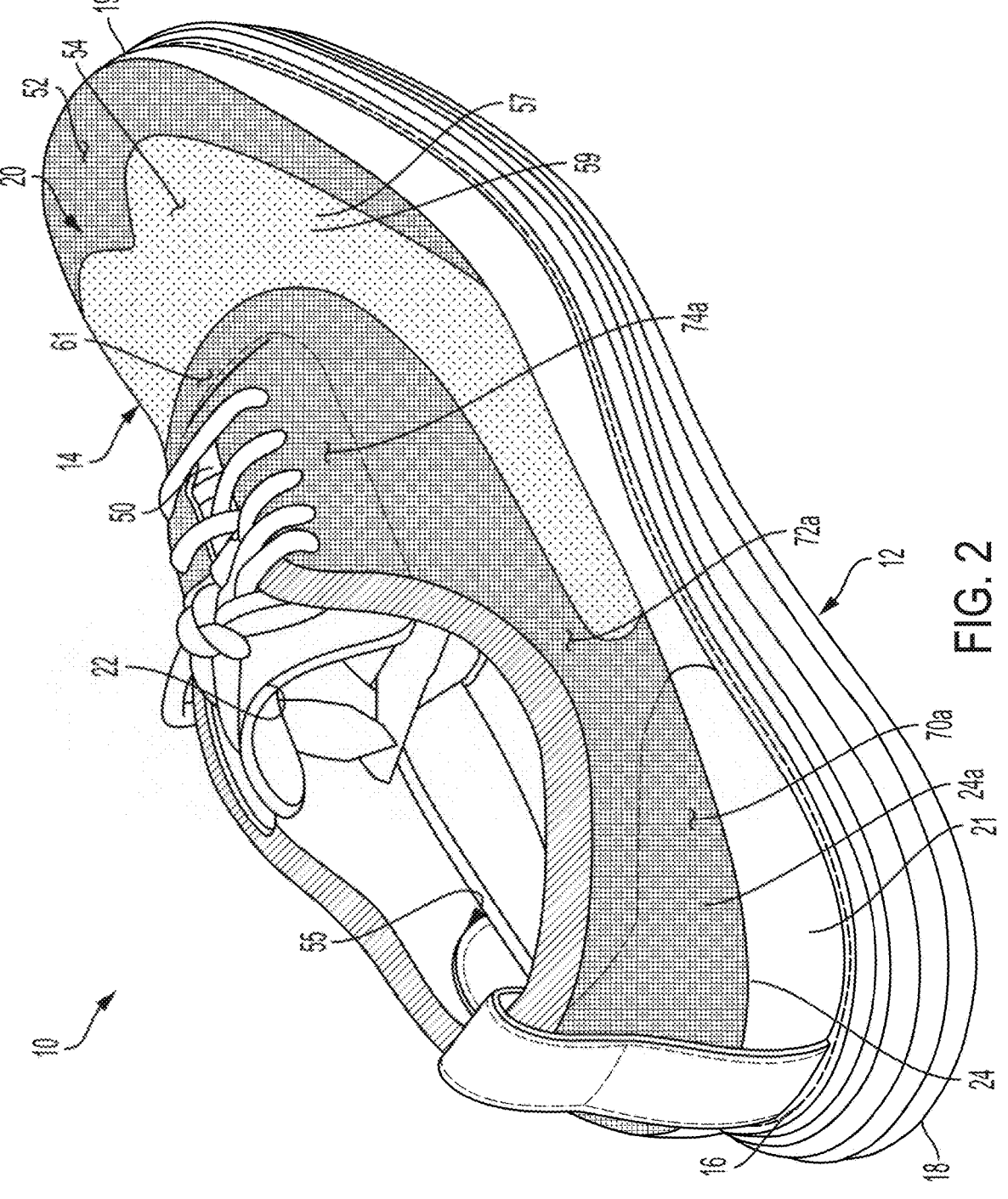
FIG. 2 is a rear lateral perspective view of the shoe of FIG. 1.
Figure 3:
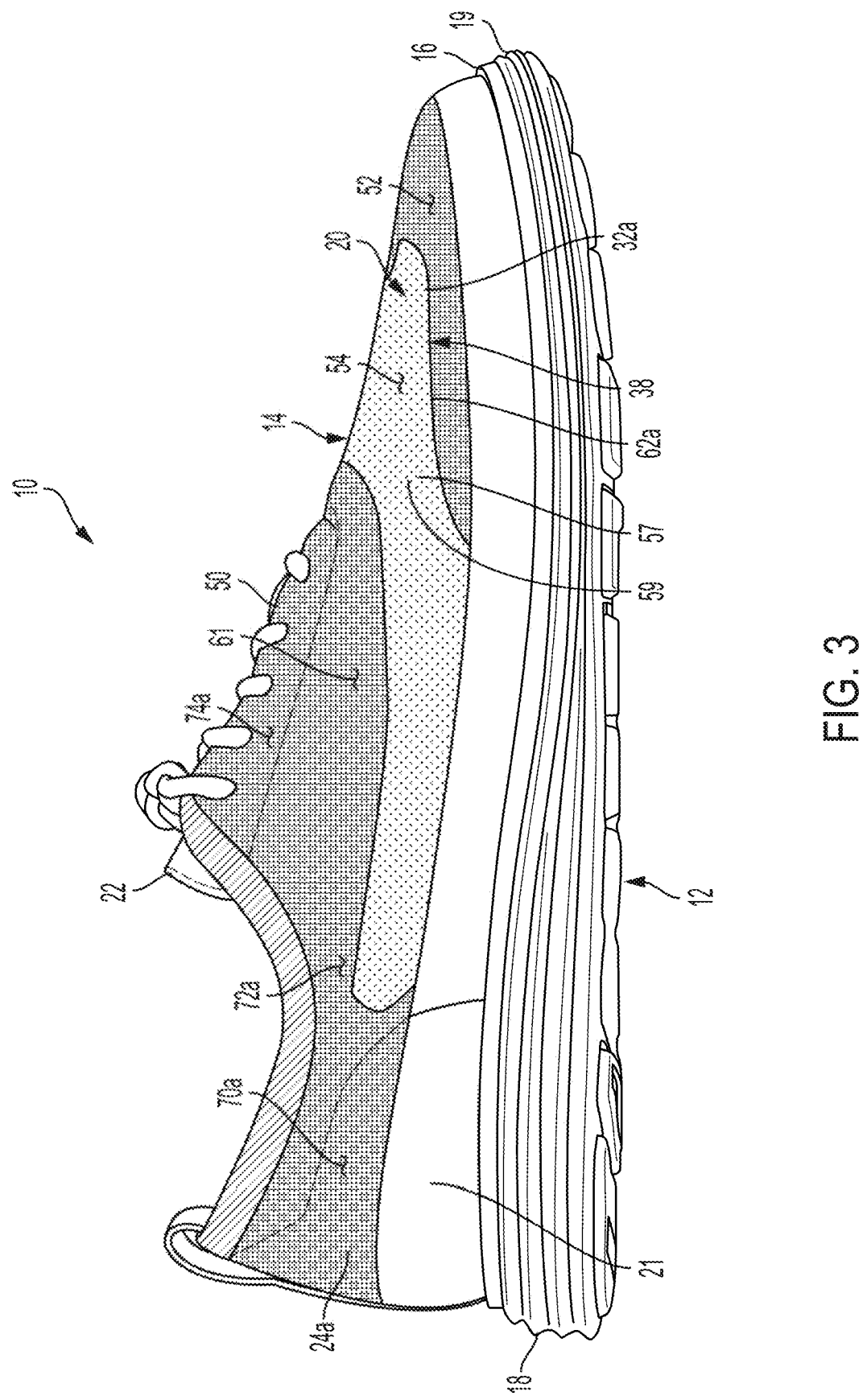
FIG. 3 is a lateral side view of the shoe of FIG. 1.
Figure 4:
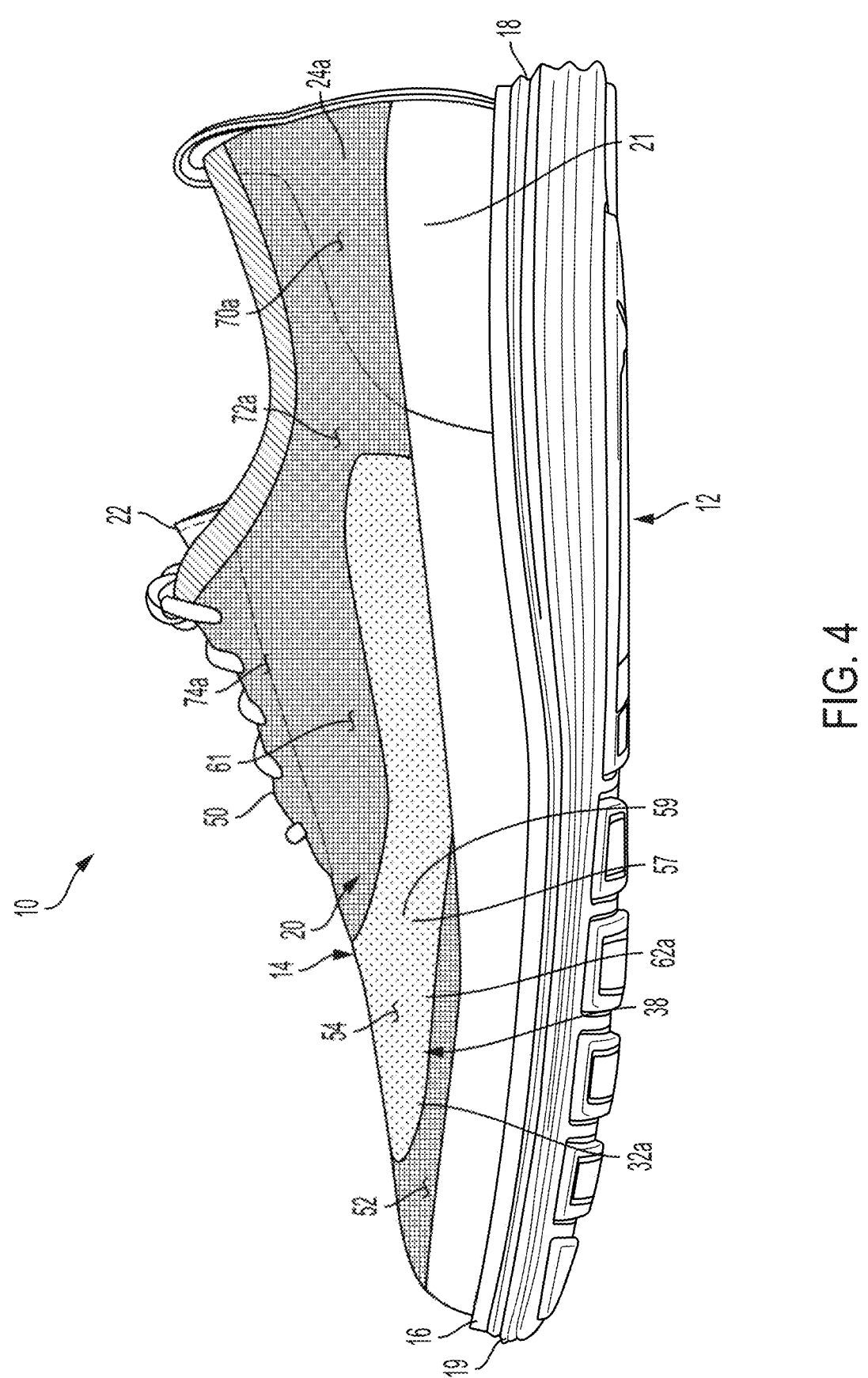
FIG. 4 is a medial side view of the shoe of FIG. 1.

Reference numerals in the written specification and in the figures indicate corresponding items.

DETAILED DESCRIPTION

An embodiment of a shoe in accordance with the present invention is indicated by reference numeral 10 in FIGS. 1-5. The shoe 10 comprises a sole, generally indicated at 12, a knit upper, generally indicated at 14, and a welt, generally indicated at 16. The sole 12 and welt 16 are secured to the upper 14. The shoe 10 extends forward from a heel end 18 to a toe end 19. A rand 21 extends around a bottom perimeter of the upper 14, adjacent the sole 12. The knit upper 14 has a knitted element 20 and a tongue 22 secured to the knitted element.

Figure 5:
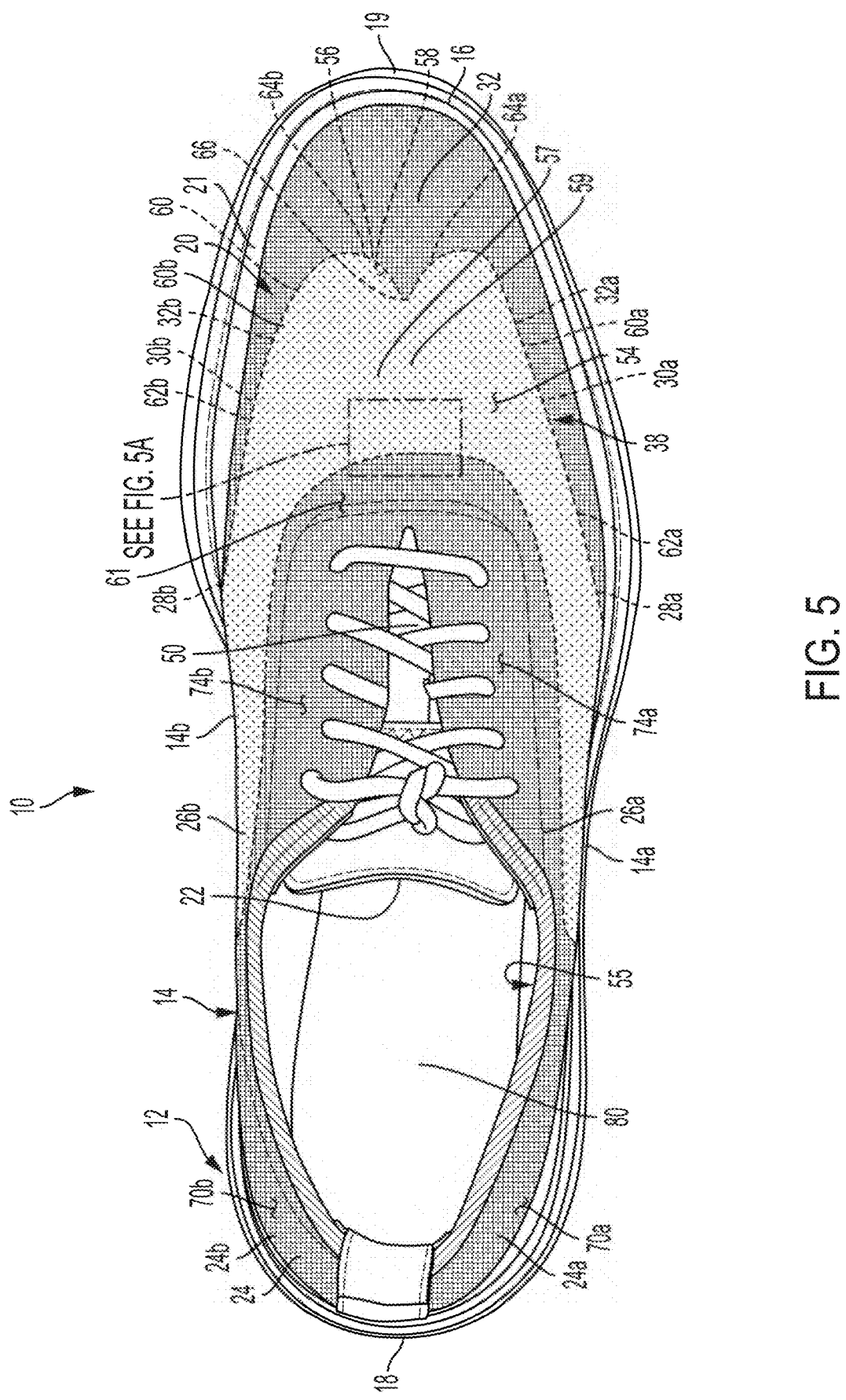
FIG. 5 is a top plan view of the shoe of FIG. 1
Figure 5A:
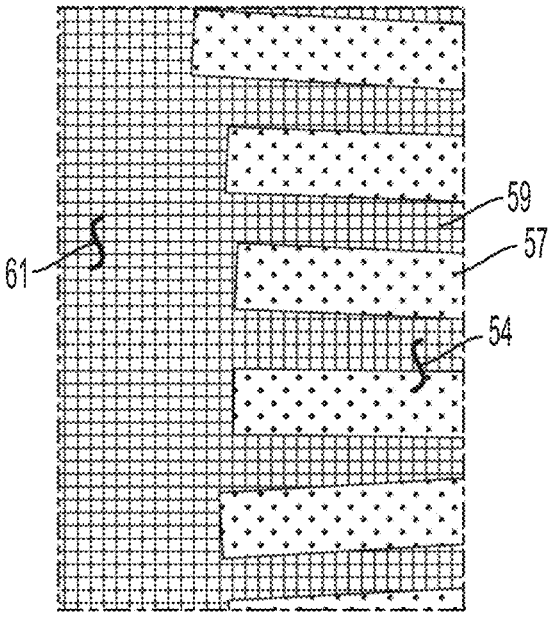
FIG. 5A is an enlarged view of a portion of the shoe as seen in FIG. 5.
Figure 5B:
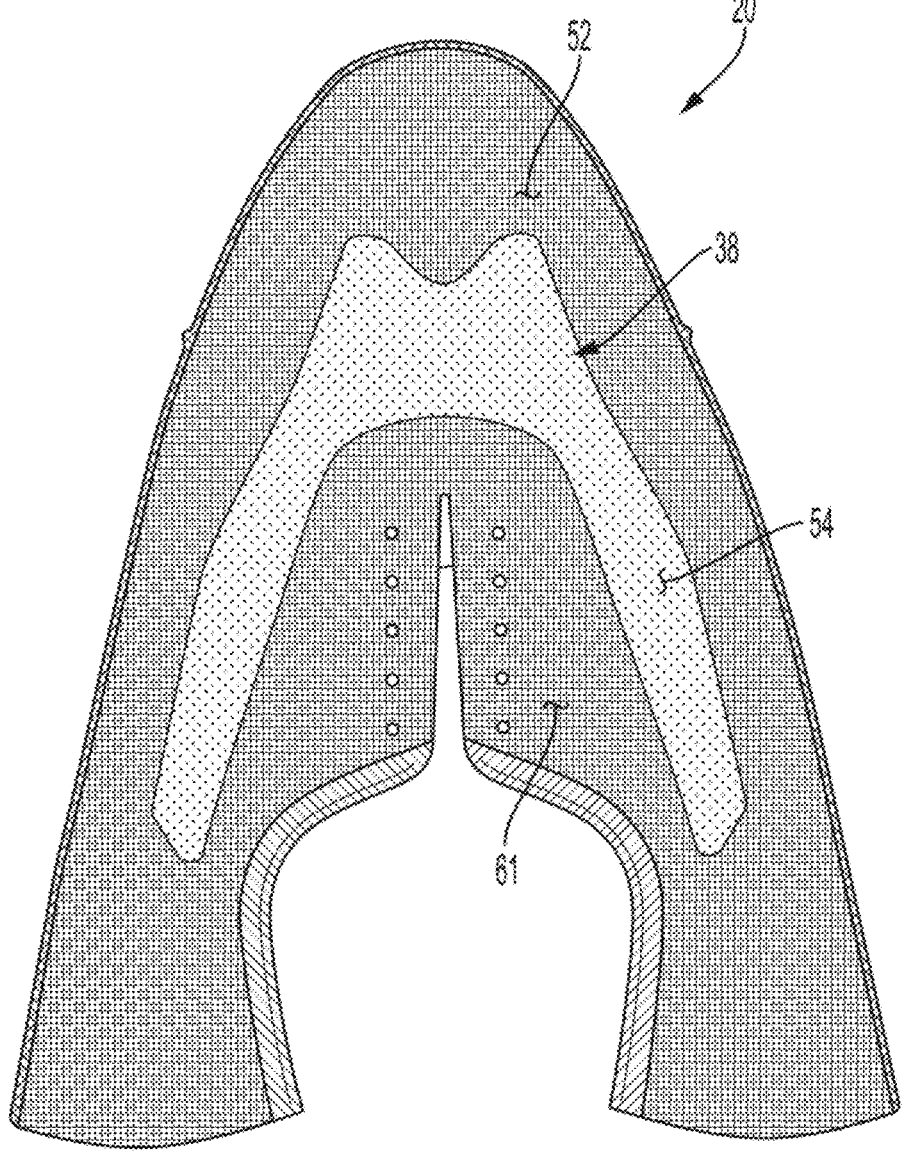
FIG. 5B is a top plan view of a knitted element to be used in making the shoe of FIG. 1.

The knitted element indicated generally at 20 in FIGS. 1-5, and depicted separately in FIG. 5B, is formed of a unitary one-piece construction during a knitting process on a knitting machine (not shown). The knitted element 20 comprises a knitted upper heel region 24, a knitted upper lateral midfoot region 26a, a knitted upper medial midfoot region 26b, a knitted upper metatarsal region 28, a knitted upper lateral ball region 30a, a knitted upper medial ball region 30b, and a knitted upper toe region 32. The upper heel region 24 includes a knitted upper lateral heel region 24a and a knitted upper medial heel region 24b. The upper metatarsal region 28 includes a knitted upper lateral metatarsal region 28a and a knitted upper medial metatarsal region 28b. The knitted upper toe region 32 includes a knitted upper lateral toe region 32a and a knitted upper medial toe region 32b. The upper 14 has a knitted upper lateral side region 14a and a knitted upper medial side region 14b. The upper lateral side region 14a includes the upper lateral heel region 24a, the upper lateral midfoot region 26a, the upper lateral metatarsal region 28a, the upper lateral ball region 30a, and the upper lateral toe region 32a. The upper medial side region 14b includes the upper medial heel region 24b, the upper medial midfoot region 26b, the upper medial metatarsal region 28b, the upper medial ball region 30b, and the upper medial toe region 32b. The upper toe region 32 is seamlessly knitted with the upper lateral and medial ball regions 30a, 30b during the knitting process. The upper lateral and medial ball regions 30a, 30b are seamlessly knitted with the upper lateral and medial metatarsal regions 28a, 28b during the knitting process. The upper lateral and medial metatarsal regions 28a, 28b are seamlessly knitted with the upper lateral and medial midfoot regions 26a, 26b during the knitting process.

The knitted element includes a wingtip pattern, generally indicated at 38. The wingtip pattern 38 comprises portions of at least the upper toe region 32, the upper lateral and medial ball regions 30a, 30b, the upper lateral and medial metatarsal regions 28a, 28b, and the upper lateral and medial midfoot regions 26a, 26b. The upper toe region 32, the upper lateral and medial ball regions 30a, 30b, and the upper lateral and medial metatarsal regions 28a, 28b collectively are knitted with the wingtip pattern 38 during the knitting process.

The knitted element 20 is knitted with a first type of knit structure in a first area, generally indicated at 52. In this embodiment, the knitted element 20 is knitted with the first type of knit structure throughout the first area 52. In a second area, generally indicated at 54, the knitted element 20 is knitted with a second type of knit structure. Within the second area 54, the knitted element includes a plurality of regions 57 of the second type of knit structure, each of the regions 57 being circumscribed by a region 59 of the first type of knit structure. In a third area, generally indicated at 61, which is generally rearward of second area 54 and located in the upper lateral and medial metatarsal regions 28a, 28b, the upper lateral and medial eyestay regions 74a, 74b the upper lateral and medial midfoot regions 72a, 72b, and the upper lateral and medial heel regions 70a, 70b, the knitted element is knitted with the first type of knit structure. In this embodiment, the knitted element 20 is knitted with the first type of knit structure throughout the third area 61.

The second type of knit structure has a different appearance than the first type of knit structure, so that the individual shapes of regions 57 of the second type of knit structure within region 59 of the first type of knit structure are visually discernible. For example, the first type of knit structure may be glossy in appearance and the second type of knit structure may be matte in appearance. Likewise, a pattern of the arrangement of regions 57 relative to one another, as well as the overall shape of the second area 54 that they occupy, is visually discernible by distinguishing regions 57 from region 59 of the first type of knit structure.

The first area 52 is generally forward of the second area 54. The first area 52 has a rear boundary 56 and the second area 54 has a forward boundary 58. The rear boundary 56 of the first area 52 and the forward boundary 58 of the second area 54 are coincident and coextensive with each other and define a boundary line 60 between the first and second areas 52, 54. The wingtip pattern 38 comprises the boundary line 60. The boundary line 60 has a lateral boundary line 60a and a medial boundary line 60b. The lateral boundary line 60a comprises a wing-shaped curved line having a lateral side portion 62a extending forward from at least the upper lateral metatarsal region 28a to the upper toe region 32, and a central portion 64a extending rearward from the upper toe region 32. The medial boundary line 60b comprises a wing-shaped curved line having a medial side portion 62b extending forward from at least the upper medial metatarsal region 28b to the upper toe region 32, and a central portion 64b extending rearward from the upper toe region 32. The central portions 64a, 64b of the lateral and medial boundary lines 60a, 60b converge rearwardly toward each other, and meet to constitute a rearwardly pointing apex 66. The apex 66 points rearwardly toward the throat 50 of the upper 14.

The knitted element 20 may be knitted with one or more yarns, such as thermoplastic yarns, polyester yarns, nylon yarns, cotton yarns, spandex yarns, and hot melt yarns. The first type of knit structure is knitted with a first yarn, which is a thermoplastic yarn, and the second type of knit structure is knitted with a second yarn, which is a yarn other than a thermoplastic yarn. In one embodiment, the first yarn is a thermoplastic polyurethane (TPU) yarn, the second yarn is a polyester yarn, and the knitted element 20 is also knitted with a hot melt yarn. During the knitting process, the hot melt yarn is knitted with the TPU yarn in the first type of knit structure and with the polyester yarn in the second type of knit structure. In this embodiment, the TPU yarn constitutes at least 25% by mass of the knitted element (and more preferably at least 30% by mass of the knitted element, but not more than 45% by mass of the knitted element), the polyester yarn constitutes at least 35% by mass of the knitted element (and more preferably at least 40% by mass of the knitted element but not more than 55% by mass of the knitted element), and the hot melt yarn constitutes at least 10% by mass of the knitted element (and more preferably at least 15% by mass of the knitted element but not more than 30% by mass of the knitted element). In addition to the TPU yarn, the polyester yarn, and the hot melt yarn, the knitted element 20 may be knitted with stretch yarn, with the stretch yarn preferably constituting at least 5% by mass of the knitted upper. If stretch yarn is included, it is preferably limited (but need not be limited) to the topline area of the knitted element 20 to provide a stretch function primarily in the ankle region of the upper 14 of the shoe 10. Preferably, the stretch yarn is spandex yarn.

The first type of knit structure and the second type of knit structure may be knitted with the same type of stitch. In the embodiment shown in FIGS. 1-5A, both knit structures are knitted with a jersey knit stitch. The TPU yarn may impart an appearance to the first type of knit structure (that is, the knit structure of the first area 52, the region 59 of the second area 54, and the third area 61), while the polyester yarn may impart a different appearance to the second type of knit structure (that is, the knit structure of regions 57 within the second area 54). The TPU yarn also has a lower melting temperature than the polyester yarn, while the hot melt yarn has a still lower melting temperature than the TPU yarn.

Figure 6:
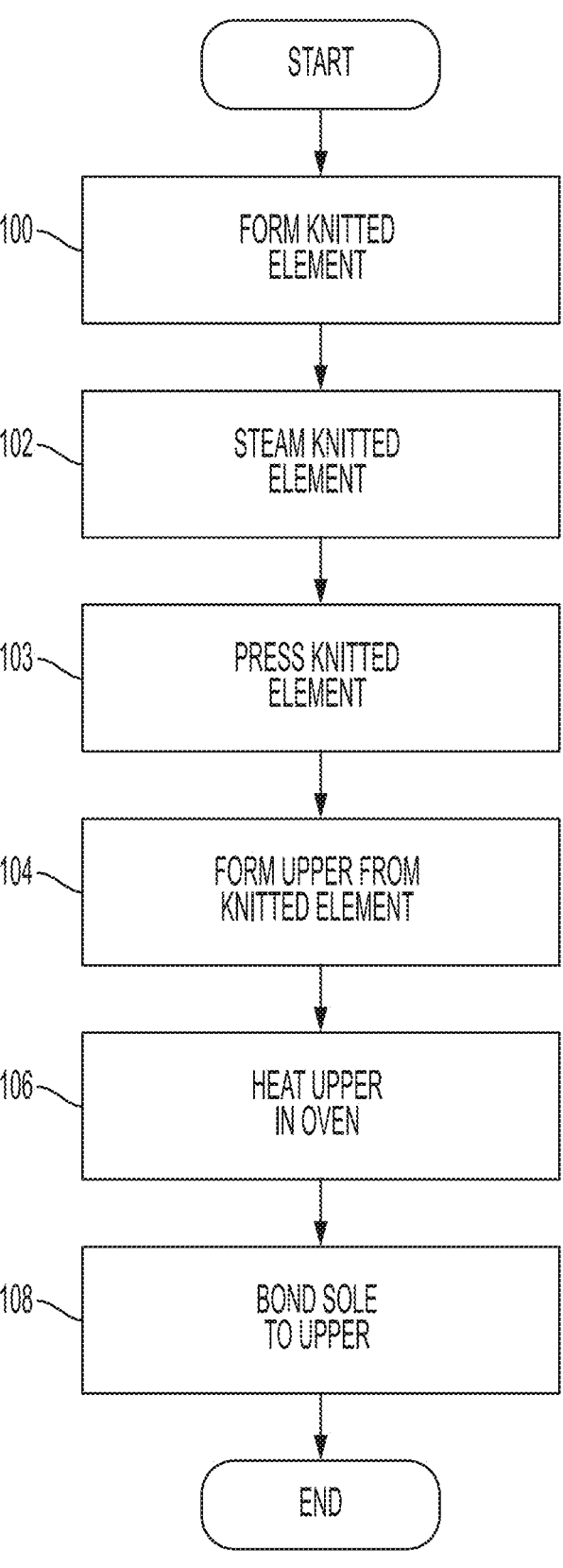
FIG. 6 is a flow diagram of a method of making the shoe of FIG. 1 according to an exemplary embodiment of the present disclosure.

FIG. 6 is a flow diagram of a method of making the shoe 10 of FIGS. 1-5A. In step 100, the knitted element 20 is formed via a knitting machine, such as a CNC knitting machine, as a unitary one-piece construction. The knitting element 20 is depicted in FIG. 5B after being formed in the knitting step 100 and prior to being steamed in a steaming step 102, indicated at reference number 102 in FIG. 6 and described in more detail below. During the knitting step 100, the upper lateral and medial heel regions 24a, 24b are knitted, the upper lateral and medial midfoot regions 26a, 26b are knitted, the upper lateral and medial metatarsal regions 28a, 28b are knitted, the upper lateral and medial ball regions 30a, 30b are knitted, and the upper lateral and medial toe regions 32a, 32b are knitted. By being knitted as a as a unitary one-piece construction, it is to be understood these various regions of the knitted element are formed together via the knitting process, as opposed to the regions being formed separately and then sewn or bonded together. As such, the upper toe region 32 is seamlessly knitted with the upper medial and lateral ball regions 30a, 30b during the knitting step, the upper medial and lateral ball regions are seamlessly knitted with the upper metatarsal region 28 during the knitting step, the upper metatarsal region is seamlessly knitted with the upper lateral and medial midfoot regions 26a, 26b during the knitting step, and the upper lateral and medial midfoot regions are seamlessly knitted with the upper lateral and medial heel regions 24a, 24b during the knitting step.

The knitted element 20 is also knitted with multiple types of knit structures during the knitting step. As described above, the first area 52, region 59 of the second area 54, and the third area 61 are of the first type of knit structure knitted with the first yarn (e.g., a TPU yarn), while regions 57 of the second area 54 are of the second type of knit structure knitted with a second yarn (e.g., a polyester yarn). As shown in FIG. 5 as incorporated into the shoe 10, the knitted element 20 also includes lateral and medial heel areas 70a, 70b (located in the third area 61) of the first type of knit structure (e.g., knitted with TPU yarn), lateral and medial midfoot areas 72a, 72b of the first type of knit structure (e.g., knitted with TPU yarn), and lateral and medial eyestay areas 74a, 74b of the first type of knit structure (e.g., knitted with TPU yarn).

After knitting in the knitting step 100 to form the knitted element 20, the knitted element 20 is then steamed (e.g., to melt the hot melt yarn) during the steaming step 102 mentioned above, and then pressed with a hot press (e.g., to melt the TPU yarn) in a pressing step 103. During step 104, the upper 14 is formed by attaching a strobel board 80 (see FIGS. 1, 5)) to the knitted element 20, attaching the tongue 22 to the knitted element, and attaching the upper lateral heel region 24a to the upper medial heel region 24b. A heel counter 82 (see FIG. 1) may also be attached to the inner surface of the upper lateral and medial heel regions 24a, 24b. The upper 14 is then placed around a last at step 106. Adhesive is applied to the underside of the strobel board 80, and the upper 14 is passed via a conveyer through an oven (or heat tunnel). The oven heats the adhesive, and the sole 12 and welt 16 are bonded via the adhesive to the strobel board 80 and bottom periphery of the knitted element at step 108. This process results in a shoe having the hot melt yarn melted in the first and second areas 52, 54 and the first yarn melted in the first area 52. The second yarn may or may not be melted in the second area depending on the temperature of the press.

An inner surface 55 of the knitted element 20 may be lined or unlined. In an unlined configuration, the inner surface 55 of the knitted element 20 is devoid of a lining (other than the heel counter 82 or eyelet reinforcement adjacent the throat) and such inner surface of the knitted element defines at least a majority of a foot receiving cavity of the shoe. In a completely lined configuration, a lining is between the inner surface of the knitted element and the foot receiving cavity of the shoe such that the foot receiving cavity of the shoe is in part defined by the lining (instead of by the inner surface of the knitted element).

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A shoe comprising:
   a knit upper;
   a sole secured to the upper;
   the knit upper having a knitted element, the knitted element being formed of a unitary one-piece construction during a knitting process on a knitting machine, the knitted element comprising a knitted upper heel region, a knitted upper lateral midfoot region, a knitted upper medial midfoot region, a knitted upper metatarsal region, a knitted upper lateral ball region, a knitted upper medial ball region, and a knitted upper toe region, the knitted upper metatarsal region including a knitted upper lateral metatarsal region and a knitted upper medial metatarsal region, the upper having a knitted upper lateral side region and a knitted upper medial side region, the upper lateral side region including the upper lateral midfoot region, the upper lateral metatarsal region and the upper lateral ball region, the upper medial side region including the upper medial midfoot region, the upper medial metatarsal region and the upper medial ball region, the upper toe region being seamlessly knitted with the upper medial and lateral ball regions during the knitting process, the upper medial and lateral ball regions being seamlessly knitted with the knitted upper metatarsal region during the knitting process, the knitted upper metatarsal region being seamlessly knitted with the upper lateral and medial midfoot regions during the knitting process;
   the knitted element comprising a first type of knit structure knitted in a first area during the knitting process, the first area being at least in the knitted upper toe region, and a second type of knit structure knitted in a second area during the knitting process, the second area being at least in the knitted upper lateral and medial metatarsal regions;

the first type of knit structure comprising a first yarn having a first yarn melting temperature and a hot melt yarn having a hot melt yarn melting temperature, and the second type of knit structure comprising a second yarn having a second yarn melting temperature and the hot melt yarn, the hot melt yarn melting temperature being lower than the first yarn melting temperature, the second yarn melting temperature being higher than the first yarn melting temperature;

the first area having a rear boundary, the second area having a forward boundary, the rear boundary of the first area and the forward boundary of the second area defining a boundary line between the first and second areas;

wherein the hot melt yarn is melted in the first and second areas and the first yarn is melted in the first area.

2. The shoe of claim 1 wherein the second yarn is not melted in the second area.

3. The shoe of claim 1 wherein the first type of knit structure is glossy in appearance and the second type of knit structure is matte in appearance.

4. The shoe of claim 1 wherein the first yarn is a thermoplastic yarn.

5. The shoe of claim 4 wherein the first yarn is a thermoplastic polyurethane yarn.

6. The shoe of claim 5 wherein the thermoplastic polyurethane yarn constitutes 25-45% by mass of the knitted element.

7. The shoe of claim 1 wherein the second yarn is a polyester yarn.

8. The shoe of claim 7 wherein the polyester yarn constitutes 35-55% by mass of the knitted element.

9. The shoe of claim 1 wherein the hot melt yarn comprises an adhesive spun into a yarn form.

10. The shoe of claim 9 wherein the hot melt yarn constitutes 10-30% by mass of the knitted element.

11. The shoe of claim 1 wherein the knitted element is knitted with the second type of knit structure in a plurality of regions within the second area, each of the plurality of regions being circumscribed by a region of the knit upper devoid of the second type of knit structure.

12. The shoe of claim 1 wherein the knitted element is knitted during the knitting process with the first type of knit structure in the second area.

13. The shoe of claim 12 wherein the first type of knit structure circumscribes at least one area of the second type of knit structure within the second area.

14. A shoe comprising:

a knit upper;

a sole secured to the upper;

the knit upper having a knitted element, the knitted element being formed of a unitary one-piece construction during a knitting process on a knitting machine, the knitted element comprising a knitted upper heel region, a knitted upper lateral midfoot region, a knitted upper medial midfoot region, a knitted upper metatarsal region, a knitted upper lateral ball region, a knitted upper medial ball region, and a knitted upper toe region, the knitted upper metatarsal region including a knitted upper lateral metatarsal region and a knitted upper medial metatarsal region, the upper having a knitted upper lateral side region and a knitted upper medial side region, the upper lateral side region including the upper lateral midfoot region, the upper lateral metatarsal region and the upper lateral ball region, the upper medial side region including the upper medial midfoot region, the upper medial metatarsal region and the upper medial ball region, the upper toe region being seamlessly knitted with the upper medial and lateral ball regions during the knitting process, the upper medial and lateral ball regions being seamlessly knitted with the knitted upper metatarsal region during the knitting process, the knitted upper metatarsal region being seamlessly knitted with the upper lateral and medial midfoot regions during the knitting process, the knitted element including a wingtip pattern, the wingtip pattern being portions of at least the upper toe region, the upper lateral and medial ball regions, and the upper lateral and medial metatarsal regions;

the knitted element comprising a first type of knit structure knitted in a first area during the knitting process and a second type of knit structure knitted in a second area during the knitting process;

the first area having a rear boundary, the second area having a forward boundary, the rear boundary of the first area and the forward boundary of the second area defining a boundary line between the first and second areas, the wingtip pattern comprising the boundary line, the boundary line having a medial boundary line and a lateral boundary line, the medial boundary line comprising a wing-shaped curved line having a medial side portion extending forward from at least the upper medial metatarsal region to the upper toe region and a central portion extending rearward from the upper toe region, the lateral boundary line comprising a wing-shaped curved line having a lateral side portion extending forward from at least the upper lateral metatarsal region to the upper toe region and a central portion extending rearward from the upper toe region, the rearwardly extending central portion of the medial boundary line converging toward the rearwardly extending central portion of the lateral boundary line;

the first type of knit structure comprising a first yarn having a first yarn melting temperature and a hot melt yarn having a hot melt yarn melting temperature, and the second type of knit structure comprising a second yarn having a second yarn melting temperature and the hot melt yarn, the hot melt yearn melting temperature being lower than the first yarn melting temperature and the second yarn melting temperature being higher than the first yarn melting temperature;

wherein the hot melt yarn is melted in the first and second areas and the first yarn is melted in the first area.

15. The shoe of claim 14 wherein the central portions of the lateral and medial boundary lines converge rearwardly toward each other, and meet to constitute a rearwardly pointing apex, the upper further comprises a throat, and wherein the apex points toward the throat.

16. The shoe of claim 14 wherein the second yarn is not melted in the second area.

* * * * *